United States Patent
Wang et al.

(10) Patent No.: US 11,323,154 B2
(45) Date of Patent: May 3, 2022

(54) DATA TRANSMISSION METHOD AND SYSTEM, MOBILE TERMINAL, AND DATA DEVICE

(71) Applicant: TENCENT TECHNOLOGY (SHENZHEN) COMPANY LIMITED, Shenzhen (CN)

(72) Inventors: Jingui Wang, Shenzhen (CN); Leteng Weng, Shenzhen (CN); Xiumin Lin, Shenzhen (CN); Kai Liu, Shenzhen (CN); Liangliang Fan, Shenzhen (CN); Zhuwei Xiong, Shenzhen (CN); Yu Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 926 days.

(21) Appl. No.: 16/026,454

(22) Filed: Jul. 3, 2018

(65) Prior Publication Data

US 2018/0316390 A1    Nov. 1, 2018

Related U.S. Application Data

(63) Continuation of application No. PCT/CN2017/083622, filed on May 9, 2017.

(30) Foreign Application Priority Data

May 10, 2016  (CN) .......................... 201610305896.3

(51) Int. Cl.
*H04B 5/00*       (2006.01)
*H04W 4/80*      (2018.01)
(Continued)

(52) U.S. Cl.
CPC ........... *H04B 5/0031* (2013.01); *H04B 11/00* (2013.01); *H04L 67/02* (2013.01); *H04W 4/80* (2018.02);
(Continued)

(58) Field of Classification Search
CPC ........ H04B 5/00; H04B 11/00; H04B 5/0031; H04L 29/08; H04L 67/02; H04W 76/14; H04W 4/80; H04W 84/18; H04W 4/70
See application file for complete search history.

(56) References Cited

U.S. PATENT DOCUMENTS 9,640,061 B1 *   5/2017   Klimanis ............. G08B 25/007
10,026,297 B2 *  7/2018   Klimanis ............... G08B 25/10
(Continued)

FOREIGN PATENT DOCUMENTS

CN       102123142 A      7/2011
CN       102592233 A      7/2012
(Continued)

OTHER PUBLICATIONS

The World Intellectual Property Organization (WIPO) International Search Report for PCT/CN2017/083622 dated Jul. 26, 2017 5 Pages (including translation).

(Continued)

*Primary Examiner* — Isam A Alsomiri
*Assistant Examiner* — Amie M N'Dure
(74) *Attorney, Agent, or Firm* — Anova Law Group, PLLC

(57) ABSTRACT

A data transmission system is provided for improving transmission scope and efficiency. The system includes a data device having a device identifier; a server having a server-side of an application program; and a mobile terminal having a client-side of the application program. The data device receives a trigger instruction, and broadcasts within (Continued)

a preset distance the device identifier of the data device according to the trigger instruction. When a distance between the mobile terminal and the data device is less than or equal to the preset distance, the mobile terminal enters the application program to receive the device identifier broadcasted by the data device, uploads the device identifier to the server-side of the application program, receives web page information that is corresponding to the device identifier and obtained by the server-side according to the device identifier, and displays the web page information on the application program of the mobile terminal.

17 Claims, 5 Drawing Sheets

(51) Int. Cl.
   *H04W 76/14* (2018.01)
   *H04B 11/00* (2006.01)
   *H04L 67/02* (2022.01)
   *H04W 4/70* (2018.01)
   *H04W 84/18* (2009.01)

(52) U.S. Cl.
   CPC .............. *H04W 76/14* (2018.02); *H04W 4/70* (2018.02); *H04W 84/18* (2013.01)

(56) References Cited

U.S. PATENT DOCUMENTS

2014/0065960 A1    3/2014  Gang et al.
2017/0206772 A1*   7/2017  Klimanis ............... H04B 11/00
2018/0284735 A1*  10/2018  Cella .................... H04L 1/0041

FOREIGN PATENT DOCUMENTS

| | | | |
|---|---|---|---|
| CN | 103391278 | A | 11/2013 |
| CN | 104205191 | A | 12/2014 |
| CN | 104219065 | A | 12/2014 |
| CN | 104380767 | A | 2/2015 |
| CN | 104735607 | A | 6/2015 |
| CN | 105472538 | A * | 4/2016 |
| CN | 105472538 | A | 4/2016 |
| CN | 105827638 | A | 8/2016 |
| WO | 2015165642 | A1 | 11/2015 |

OTHER PUBLICATIONS

The State Intellectual Property Office of the People's Republic of China (SIPO) Office Action 1 for 201610305896.3, dated Jun. 4, 2018 10 Pages (including translation).

* cited by examiner

DATA TRANSMISSION METHOD AND SYSTEM, MOBILE TERMINAL, AND DATA DEVICE

RELATED APPLICATIONS

This application is a continuation application of PCT Patent Application No. PCT/CN2017/083622, filed on May 9, 2017, which claims priority to Chinese Patent Application No. 201610305896.3, entitled "DATA TRANSMISSION METHOD, APPARATUS, AND SYSTEM" filed with the Patent Office of China on May 10, 2016, which is incorporated by reference in its entirety.

FIELD OF THE TECHNOLOGY

The present disclosure relates to the field of data transmission, and in particular, to a data transmission method and system, a mobile terminal, and a data device.

BACKGROUND OF THE DISCLOSURE

With the development of electronic technologies, various electronic products emerge. Some electronic products are installed in various environment as data label devices, and can provide data information. When a user scans a data label device by using a read terminal corresponding to the data label device, data stored in the data label device can be read, but the amount of the obtained data information is small.

The disclosed methods and systems are directed to solve one or more problems set forth above and other problems.

SUMMARY

According to various embodiments of this application, a data transmission method and system, a mobile terminal, and a data device are provided.

According to one aspect of the present disclosure, a data transmission system is provided for improving transmission scope and efficiency. The system includes a data device having a device identifier; a server having a server-side of an application program; and a mobile terminal having a client-side of the application program. The data device receives a trigger instruction, and broadcasts within a preset distance the device identifier of the data device according to the trigger instruction. When a distance between the mobile terminal and the data device is less than or equal to the preset distance, the mobile terminal enters the application program to receive the device identifier broadcasted by the data device, uploads the device identifier to the server-side of the application program, receives web page information that is corresponding to the device identifier and obtained by the server-side according to the device identifier, and displays the web page information on the application program of the mobile terminal.

According to another aspect of the present disclosure, a data transmission method is provided for a mobile terminal having a client-side of an application program. The method includes receiving a device identifier of a data device, where the device identifier is broadcasted within a preset distance by the data device according to a trigger instruction when a distance between the mobile terminal and the data device is less than or equal to the preset distance. The method also includes uploading the device identifier to a server-side corresponding to the application program; receiving corresponding web page information found by the server-side according to the device identifier; and displaying the web page information on the application program.

According to another aspect of the present disclosure, a data transmission method is provided for a data device. The method includes generating a broadcast instruction according to a trigger operation; and broadcasting within a preset distance a device identifier of the data device according to the broadcast instruction, which causes that, when a distance between a mobile terminal and the data device is less than or equal to the preset distance, the mobile terminal enters an application program, receives the device identifier broadcasted by the data device, uploads the device identifier to a server-side corresponding to the application program, receives web page information that is corresponding to the device identifier and found by the server-side according to the device identifier, and displays the web page information on the application program of the mobile terminal.

Details of one or more embodiments of the present invention are provided in the following accompanying drawings and descriptions. Other features, objectives, and advantages of the present disclosure become clear in the specification, the accompanying drawings, and the claims.

BRIEF DESCRIPTION OF THE DRAWINGS

To describe the technical solutions in the embodiments of the present disclosure or in the existing technology more clearly, the following briefly describes the accompanying drawings. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings. It should be understood that the specific embodiments described herein are merely used to explain the present disclosure but are not intended to limit the present disclosure.

It may be understood that, the terms "first" and "second" used in the present disclosure may be used to describe various elements in this specification. However, these elements are not limited by these terms. These terms are used to only distinguish a first element from another element. For example, without departing from the scope of the present disclosure, a first client may be referred to as a second client, and similarly, a second client may be referred to as a first client. Both the first client and the second client are clients, but not a same client.

Figure 1:
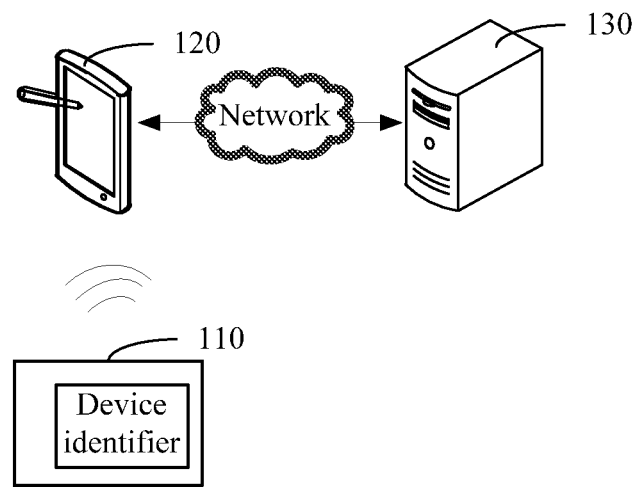
FIG. 1 is a schematic diagram of an application environment of a data transmission method according to an embodiment of the present disclosure.

FIG. 1 is a schematic diagram of an application environment of a data transmission method according to an embodiment. As shown in FIG. 1, the application environment includes a data device 110, a mobile terminal 120, and an application server 130. The data device 110 uploads a device identifier of the data device 110 to the application server 130 in which the application program server-side is located, and registers with the application server 130, to obtain corresponding web page information. The application server 130 records and stores a correspondence between the device identifier and the web page information. After receiving a trigger instruction, the data device 110 automatically broadcasts the device identifier of the data device 110. An application program client-side corresponding to an application program server-side on the application server 130 is installed on the mobile terminal 120, which is close to the data device 110. The application program client-side on the mobile terminal 120 receives the device identifier broadcasted by the data device 110 when a distance between the mobile terminal 120 and the data device 110 is less than or equal to a preset distance, and uploads the device identifier to the application server 130 in which the application program server-side is located. The application program server-side finds web page information corresponding to the device identifier according to the device identifier, and returns the web page information to the mobile terminal 120 in which the application program client-side is located. After receiving the web page information, the mobile terminal 120 displays the web page information on the application program.

As used herein, the application program may be a computer application program for implementing the disclosed transmission method. A client-side may refer to a client software program corresponding to the application program and running on a terminal device, or the terminal device itself while running the application program. A server-side may refer to a server software program corresponding to the application program and running on a server, or the server itself while running the application program.

The data device 110 may transmit data with the mobile device 120 by using a Bluetooth communication function, a Near Field Communication (NFC) function, or an acoustic wave transmission function. The device identifier is used to uniquely identify the data device. The device identifier may be formed by one or more of letters, numbers, and symbols.

Figure 2A:
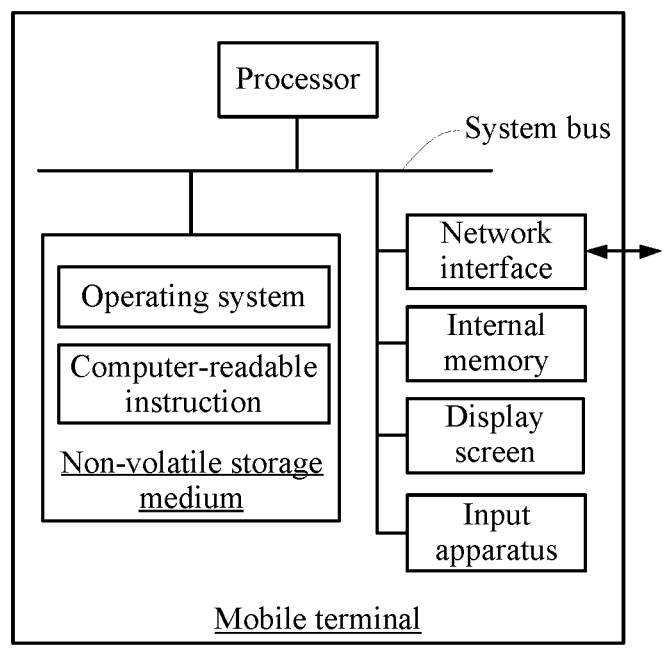
FIG. 2A is a schematic diagram of a structure of a mobile terminal according to an embodiment of the present disclosure.

FIG. 2A is a schematic diagram of an exemplary structure of a mobile terminal ix) 120 according to an embodiment. As shown in FIG. 2A, the mobile terminal 120 includes a processor, a non-volatile storage medium, an internal memory, a network interface, a display screen, and an input apparatus that are connected by using a system bus. The non-volatile storage medium of the mobile terminal stores an operating system and computer-readable instructions. When the computer-readable instructions are executed by the processor, a data transmission method is implemented. The processor is configured to provide computing and control capabilities to support running of the entire terminal.

The internal memory of the mobile terminal provides an environment for running of a data transmission apparatus in the non-volatile storage medium. The network interface is configured to perform network communication with a server, such as sending a device identifier to the server, or receiving web page information returned by the server.

The display screen of the mobile terminal may be a liquid crystal display screen, an e-ink display screen, or the like. The input apparatus may be a touch layer covering the display screen, or may be a key, a track ball, or a touchpad disposed on a housing of the terminal, or may be an external keyboard, touchpad, or mouse. The mobile terminal may be a mobile phone, a tablet computer, a personal digital assistant, a wearable device, or the like. A person skilled in the art may understand that, in the structure shown in FIG. 2A, only a block diagram of a partial structure related to a solution in this application is shown, and does not constitute a limit to the terminal to which the solution in this application is applied. Specifically, the terminal may include more components or fewer components than those shown in the figure, or some components may be combined, or a different component deployment may be used.

Figure 2B:
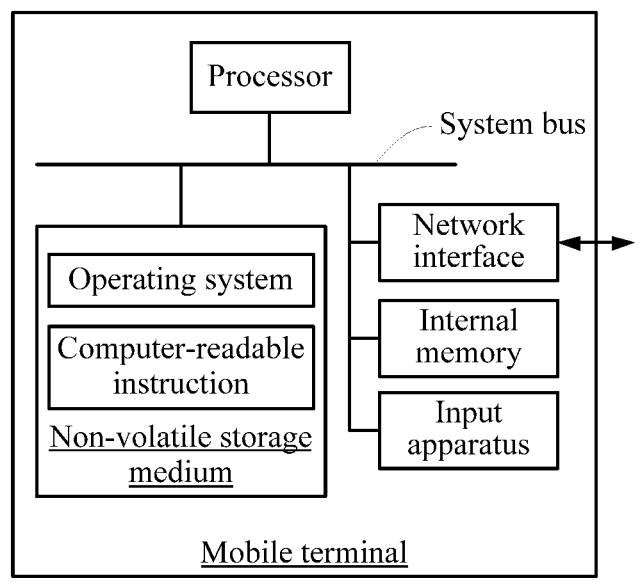
FIG. 2B is a schematic diagram of a structure of a data device according to an embodiment of the present disclosure.

FIG. 2B is a schematic diagram of an exemplary structure of a data device 110 according to an embodiment. As shown in FIG. 2B, the data device includes a processor, a non-volatile storage medium, an internal memory, a communication apparatus, and an input apparatus that are connected by using a system bus. The non-volatile storage medium of the mobile terminal stores an operating system and computer-readable instructions. When the computer-readable instructions are executed by the processor, a data transmission method is implemented. The processor is configured to provide computing and control capabilities to support running of the entire terminal. The internal memory of the mobile terminal provides an environment for running of a data transmission apparatus in the non-volatile storage medium. The input apparatus may be a touch layer covering the display screen, or may be keys, a track ball, or a touch panel disposed on the casing of the terminal, or may be an external keyboard, a touch panel, a mouse, or the like. The data device may be an electronic device supporting multiple transmission manners. A person skilled in the art may understand that, in the structure shown in FIG. 2B, only a block diagram of a partial structure related to a solution in this application is shown, and does not constitute a limit to the terminal to which the solution in this application is applied. Specifically, the terminal may include more components or fewer components than those shown in the figure, or some components may be combined, or a different component deployment may be used.

Figure 3:
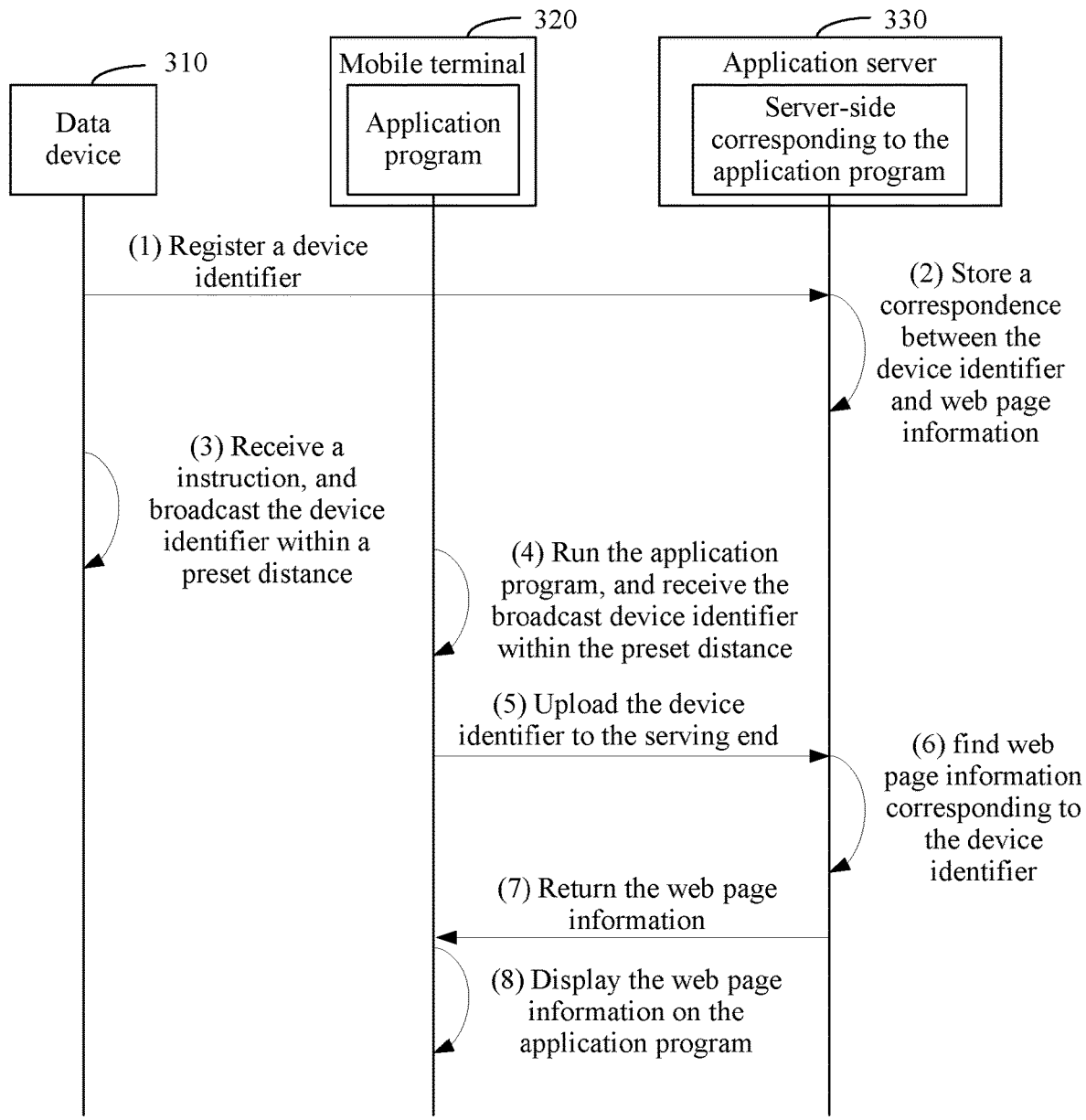
FIG. 3 is a sequence diagram of a data transmission system according to an embodiment of the present disclosure.

FIG. 3 is a sequence diagram of a data transmission system according to an embodiment. As shown in FIG. 3, the data transmission system includes a data device 310, a mobile terminal 320, and an application server 330.

The data device 310 is configured to: receive a trigger instruction, and broadcast a device identifier of the data device according to the trigger instruction within a preset distance.

In one embodiment, the data device 310 may provide an input device such as a key pad or a touch screen, obtain a trigger operation of a user using the key pad or the touch screen, generate a trigger instruction, and broadcast a device identifier of the data device 310 within the preset distance in response to the trigger instruction. The preset distance is not excessively large, and is generally from 0 m to 1 m. A preferred distance is from 5 cm to 10 cm, or the like. As such, it may avoid an excessive length of the distance, which may cause the mobile terminal 320 to obtain device identifiers broadcasted by multiple data devices during scanning. A smaller transmit power of the data device 310 indicates a shorter broadcast distance. Likewise, reducing the requirement on the broadcast distance can reduce the transmit power of the data device 310. If the distance is short, the transmit power of the data device can be reduced and, when scanning the data device, it is less likely for the mobile terminal to obtain multiple data devices easily, thereby ensuring the accuracy of the obtained device identifier of the data device, and avoiding confusion.

The device identifier is a unique identifier representing the data device 310. The device identifier may include one or more of letters, numbers, or symbols.

The data device 310 starts counting time when the device identifier of the data device starts broadcasting; and stops broadcasting the device identifier of the data device when the time count reaches a specified time duration. When receiving multiple trigger instructions, the data device 310 starts counting time when the data device starts broadcasting the device identifier according to a last trigger instruction.

The mobile terminal 320 is configured to enter an application program when a distance between the mobile terminal 320 and the data device 310 is less than or equal to the preset distance, receive, by using the application program, the device identifier broadcasted by the data device 310, upload the device identifier to the application server 330 corresponding to the application program, receive web page information that is corresponding to the device identifier and found by the server-side according to the device identifier, and display the web page information on the application program of the mobile terminal 320.

The time duration for the mobile terminal 320 to obtain the device identifier of the data device 310 does not exceed a time threshold. The time threshold may be any value, such as 1 s.

The application program is installed on the mobile terminal 320. The mobile terminal 320 runs the application program, enters a specified page of the application program, and scans the data device 310 by using the application program. Data broadcasted by the data device 310 can be received only when a distance between the mobile terminal 320 and the data device 310 is less than or equal to a preset distance. The data broadcasted includes the device identifier. The specified page may be a page searching for an adjacent device.

A server-side corresponding to the application program is installed on the application server 330. The data device 310 registers in the server-side corresponding to the application program. The server-side corresponding to the application program allocates web page information corresponding to the device identifier to the data device 310, and records a correspondence between the device identifier and the web page information. The web page information may be a coupon, a sign-in page, a device operation page, or the like. The server-side corresponding to the application program finds the corresponding web page information from the correspondence between the device identifier and the web page information according to the device identifier, and returns the web page information to the mobile terminal 320.

The mobile terminal 320 receives the web page information corresponding to the device identifier, and displays the web page information on the application program.

In the foregoing data transmission system, the data device 310 broadcasts a device identifier of the data device 310 according to a trigger instruction. The mobile terminal 320 scans the data device 310 by using an application program.

The mobile terminal 320 receives the device identifier broadcasted by the data device 310 when a distance between the data device 310 and the mobile terminal 320 is less than or equal to a preset distance, and obtains web page information from a server-side corresponding to the application program according to the device identifier. The mobile terminal obtains the device identifier by scanning the data device, and obtains web page data according to the device identifier, and the amount of the obtained data information is large. The mobile terminal scans the data device by using the application program, so that no special read device needs to be used, and the costs are reduced. The data device broadcasts the device identifier, so that the data types and/or transmission scope of the data device can be expanded.

In an embodiment, the data device 310 supports a near field communication function, a Bluetooth communication function, and an acoustic wave transmission function.

When an operating system type of the mobile terminal is a first type of operating system, and the distance between the mobile terminal and the data device is less than or equal to the preset distance, the mobile terminal detects whether a Bluetooth communication function is enabled; and if the Bluetooth communication function is enabled, the mobile terminal communicates with the data device by using the Bluetooth communication function, to obtain the device identifier; or if the Bluetooth communication function is disabled, the mobile terminal communicates with the data device by using an acoustic wave transmission function, to obtain the device identifier.

In one embodiment, the first type of operating system may be an operating system supporting a Bluetooth communication function and an acoustic wave transmission function, for example, an IOS operating system.

When an operating system type of the mobile terminal is a second type of operating system, and the distance between the mobile terminal and the data device is less than or equal to the preset distance, the mobile terminal detects whether the mobile terminal supports a near field communication function; and if the near field communication function is supported, the mobile terminal communicates with the data device by using the near field communication function, to obtain the device identifier; or if the near field communication function is not supported, detecting whether a Bluetooth communication function is enabled; and if the Bluetooth communication function is enabled, the mobile terminal communicates with the data device by using the Bluetooth communication function, to obtain the device identifier; or if the Bluetooth communication function is disabled, invoking an acoustic wave transmission function to communicate with the data device, to obtain the device identifier.

In one embodiment, the second type of operating system may be an operating system supporting a near field communication function, a Bluetooth communication function, and an acoustic wave transmission function, for example, an Android operating system.

A Bluetooth transmission protocol used by the Bluetooth communication function is standard BLE broadcast. All data is transmitted by using a BLE broadcast packet, and apart from bytes necessary for the BLE format, the length of data that can be transmitted may be 24 bytes. This is not limited.

A data format of an NFC transmission protocol used by the NFC communication function is an NFC Data Exchange Format (NDEF). The NDEF is formed by data records, and each record is formed by a packet header and an effective payload. The type and size of data recorded by the NDEF is denoted by a packet header that records a payload, and the packet header includes Length, Type and Identifier.

An acoustic wave transmission protocol used by the acoustic wave transmission function performs communication at multiple frequencies each within preset duration. Each frequency represents different data. The quantity of the multiple frequencies is about 6. The preset duration is set according to a requirement, for example, may be approximately 5 ms.

The acoustic wave transmission may use the following two groups of frequencies, as shown in Table 1 and Table 2.

TABLE 1

| Frequency | Description |
| --- | --- |
| 18000 | Data packet transmission starts |
| 18400 | Binary 00 |
| 18800 | Binary 01 |
| 19200 | Binary 10 |
| 19600 | Binary 11 |
| 20000 | Data packet transmission ends |

TABLE 2

| Frequency | Description |
| --- | --- |
| 17000 | Data packet transmission starts |
| 17600 | Binary 00 |
| 18200 | Binary 01 |
| 18800 | Binary 10 |
| 19400 | Binary 11 |
| 20000 | Data packet transmission ends |

It can be known from Table 1 and Table 2 that, except the frequencies at which data packet transmission starts and ends, each of the other frequencies represents binary double bits. Both of the two groups of frequencies may implement acoustic wave transmission. The difference between neighboring frequencies in Table 1 is smaller, and the required acoustic wave precision is higher. The higher frequency cannot be easily interfered, and the transmission distance is farther. The difference between neighboring frequencies in Table 2 is larger, and the required acoustic wave precision is not high. The lower frequency is easily interfered, and the transmission distance is closer than the frequency transmission distance in Table 1.

The data transmission uses a small end mode. Every four frequencies represent one byte, and a frequency received first represents a lower bit. A data packet format is a data packet identifier (1 Byte)+data content (DATA)+a check bit (CRC 16, occupying 2 bytes).

The data packet identifier is one byte, and the meaning of each bit is shown in Table 3.

TABLE 3

| Data bit | Description |
| --- | --- |
| $7^{th}$ and $8^{th}$ bits | The quantity of data packets transmitted this time, where the value range of two bits is from 0 to 3, representing data values 1 to 4, and four data packets at most can be transmitted in one data transmission |
| $5^{th}$ and $6^{th}$ bits | The value range 0 to 3 of sequence numbers of data packets |
| $1^{st}$ to $4^{th}$ bits | The quantity of bytes of a data packet, where the value does not include a data packet flag bit and a CRC 16, and the length of data transmitted by the data packet is 15, so that the length of data that can be transmitted at most in one data transmission is 60 bytes (4 * 15) |

Starting frequencies being 16000 and 17000 are used to perform a test, and it is discovered that a higher frequency indicates a farther transmission distance and stronger anti-interference in a transmission process. The acoustic wave is converged to improve the success rate of identification for the acoustic wave. The highest sound frequency that can be received by Android and IOS systems is 20000 because the sound whose frequency is higher than 20000 is ultrasonic wave. Therefore, human ears can sense the frequency transmitted by using acoustic wave.

In an embodiment, if the mobile terminal 320 cannot obtain the corresponding web page information according to the device identifier, the mobile terminal 320 needs to communicate with the data device 310 again, to obtain the device identifier of the data device 310.

In an embodiment, the mobile terminal 320 receives data that includes the device identifier and a check code and that is broadcasted by the data device 310, parses the data to obtain the device identifier, generate a new check code according to the device identifier, and compares whether the new check code is the same as the check code in the received data, if the two check codes are the same, checking succeeding and it indicating a successful data reception; otherwise, it indicating a failed data reception. That is, when the new check code and the current check code are the same, the mobile determines that the data received is usable and, otherwise, that the data received is not usable.

Figure 4:
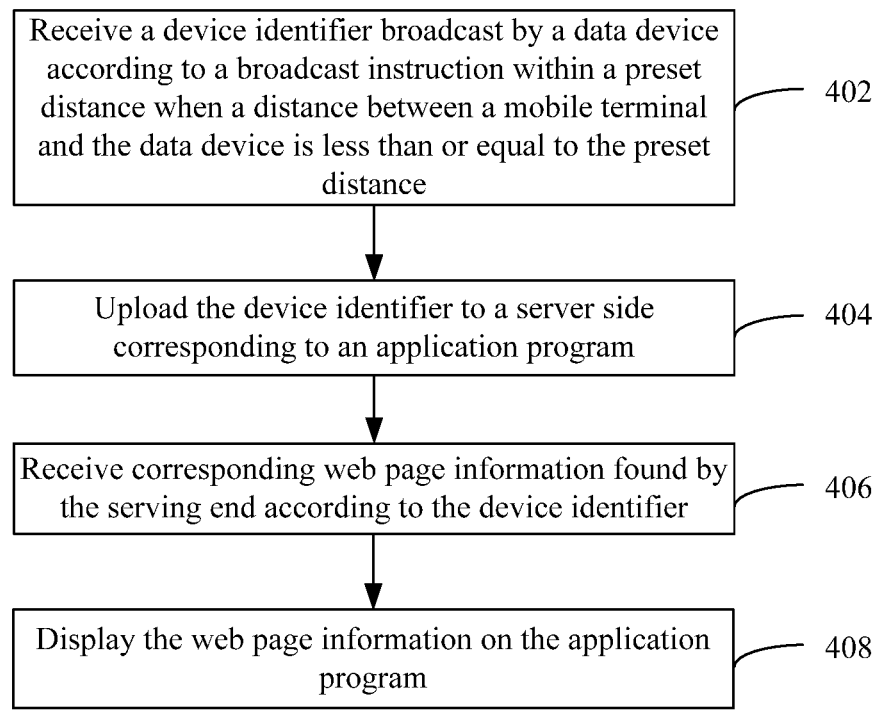
FIG. 4 is a flowchart of a data transmission method according to an embodiment of the present disclosure.

FIG. 4 is a flowchart of a data transmission method according to an embodiment. As shown in FIG. 4, the data transmission method is described from the perspective of an application program located on a mobile terminal, and includes the followings.

Step 402. When a distance between a mobile terminal and a data device is less than or equal to a preset distance, receiving a device identifier broadcasted within the preset distance by the data device according to a broadcast instruction.

In one embodiment, the mobile terminal 320 runs an application program, and enters a specified page of the application program. The specified page may be a page for searching for an adjacent function, or the like.

When the distance between the mobile terminal and the data device is less than or equal to the preset distance, the application program can receive a device identifier broadcasted within the preset distance by the data device according to the broadcast instruction.

The preset distance is not excessively large, and is generally 0 m to 1 m. A preferred distance is approximately from 5 cm to 10 cm, or the like. To avoid an excessive length of the distance, during scanning, the mobile terminal 320 obtains device identifiers broadcasted by multiple data devices. A smaller transmit power of the data device 310 indicates a shorter broadcast distance. Likewise, reducing a requirement of the broadcast distance can reduce the transmit power of the data device 310. If the distance is short, the transmit power of the data device can be reduced, and when scanning the data device, the mobile terminal is less likely scans multiple data devices, thereby ensuring the accuracy of the obtained device identifier of the data device, and avoiding confusion.

Step 404. Uploading the device identifier to a server-side corresponding to an application program.

In one embodiment, an application program client-side on the mobile terminal uploads the device identifier to the server-side corresponding to the application program.

Step 406. Receiving corresponding web page information found by the server-side according to the device identifier.

In one embodiment, the server-side corresponding to the application program finds corresponding web page information from a correspondence between the device identifier and the web page information according to the device identifier. The web page information may be a coupon, a sign-in page, a device operation page, or the like.

Step 408. Displaying the web page information on the application program.

In the foregoing data transmission method, an application program receives a device identifier broadcasted by the data device when a distance between the data device and the mobile terminal is less than or equal to a preset distance, and obtains web page information from a server-side corresponding to the application program according to the device identifier. The mobile terminal obtains the device identifier, and obtains web page data according to the device identifier, and the amount of the obtained data information is large. The mobile terminal obtains the device identifier of the data device by using the application program, so that no special read device needs to be used, and the costs are reduced. The data device broadcasts the device identifier, so that the data transmission scope of the data device can be expanded.

In an embodiment, the process of receiving a device identifier broadcasted within a preset distance by a data device according to a broadcast instruction when a distance between a mobile terminal and the data device is less than or equal to the preset distance includes: when an operating system type of the mobile terminal is a first type of operating system, and the distance between the mobile device and the data device is less than or equal to the preset distance, detecting whether a Bluetooth communication function is enabled; and if the Bluetooth communication function is enabled, invoking the Bluetooth communication function to communicate with the data device, to obtain the device identifier; or if the Bluetooth communication function is disabled, invoking an acoustic wave transmission function to communicate with the data device, to obtain the device identifier.

The above process of receiving further includes: when an operating system type of the mobile terminal is a second type of operating system, and the distance between the mobile device and the data device is less than or equal to the preset distance, detecting whether the mobile terminal supports a near field communication function; and if the near field communication function is supported, invoking the near field communication function to communicate with the data device, to obtain the device identifier; or if the near field communication function is not supported, invoking the application program to detect whether a Bluetooth communication function is enabled; and if the Bluetooth communication function is enabled, invoking the Bluetooth communication function to communicate with the data device, to obtain the device identifier; or if the Bluetooth communication function is disabled, invoking an acoustic wave transmission function to communicate with the data device, to obtain the device identifier.

In one embodiment, the first type of operating system may be an operating system supporting a Bluetooth communication function and an acoustic wave transmission function, for example, an IOS operating system. The application program detects whether the Bluetooth communication function is enabled.

In one embodiment, the second type of operating system may be an operating system supporting a near field communication function, a Bluetooth communication function, and an acoustic wave transmission function, for example, an Android operating system. The application program invokes the near field communication function, the Bluetooth communication function, and the acoustic wave transmission function to communicate with the data device.

Accordingly, by using multiple data transmission manners, different mobile terminals can be adapted, to implement data transmission.

In an embodiment, the process of invoking an acoustic wave transmission function to communicate with the data device to obtain the device identifier includes: invoking the acoustic wave transmission function to communicate with the data device, obtaining data sent by the data device at each of multiple different frequencies within preset duration, and parsing the data to obtain the device identifier.

In one embodiment, the number of the multiple frequencies or frequency ranges is 6. The preset duration is set according to a requirement, for example, may be 5 ms.

Figure 5:
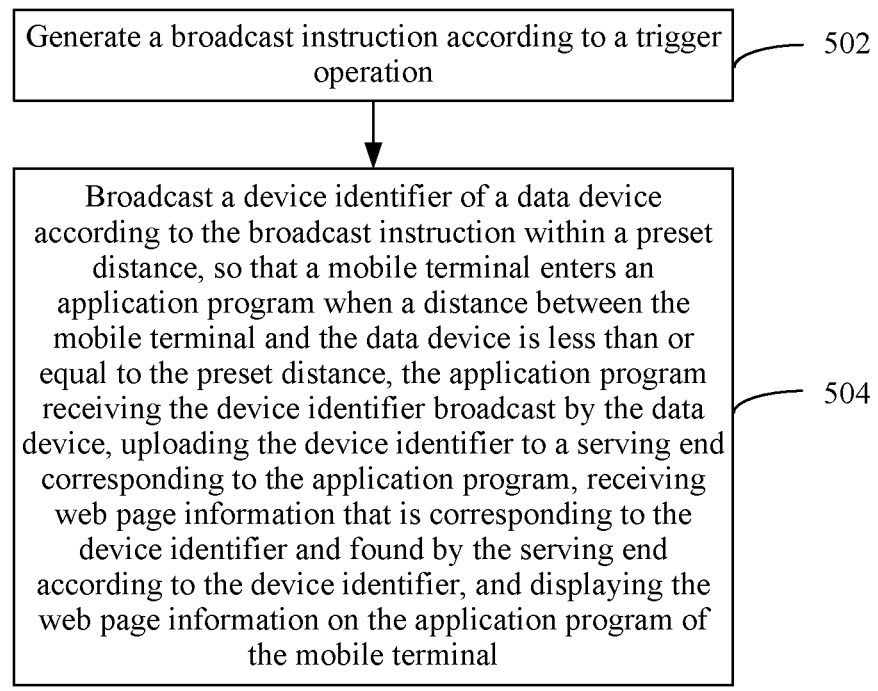
FIG. 5 is a flowchart of a data transmission method according to another embodiment of the present disclosure.

FIG. 5 is a flowchart of a data transmission method according to another embodiment. As shown in FIG. 5, the data transmission method is described from the perspective of an application program located on a data device, and includes:

Step 502. Generating a broadcast instruction according to a trigger operation.

In one embodiment, the application program detects a trigger operation from a key pad or a touch screen on the data device, to generate a broadcast instruction.

Step 504. Broadcasting within a preset distance a device identifier of the data device according to the broadcast instruction, such that, when the distance between a mobile terminal and the data device is less than or equal to the preset distance, the mobile terminal enters an application program, where the application program receives the device identifier broadcasted by the data device. The mobile terminal further uploads the device identifier to a server-side corresponding to the application program, receives web page information that is corresponding to the device identifier and found by the server-side according to the device identifier, and displays the web page information on the application program of the mobile terminal.

In the foregoing data transmission method, the mobile terminal receives, by using an application program, a device identifier broadcasted by the data device when a distance between the data device and the mobile terminal is less than or equal to a preset distance, and obtains web page information from a server-side corresponding to the application program according to the device identifier. The mobile terminal obtains the device identifier by scanning the data device, and obtains web page data according to the device identifier, and the amount of the obtained data information is large. The mobile terminal scans the data device by using the application program, so that no special read device needs to be used, and the costs are reduced. The data device broadcasts the device identifier, so that the data transmission scope of the data device can be expanded.

In an embodiment, after the process of broadcasting a device identifier of the data device according to the trigger instruction within a preset distance, the data transmission method further includes: starting counting time when the device identifier of the data device starts to be broadcasted; and stopping broadcasting the device identifier of the data device when the time count reaches a specified duration.

Specifically, the specified duration may be set according to an actual requirement. For example, the specified duration may be approximately 5 s, 10 s, or the like.

In an embodiment, the data device supports a near field communication function, a Bluetooth communication function, and an acoustic wave transmission function.

When an operating system type of the mobile terminal is a first type of operating system, the distance between the data device and the mobile terminal is less than or equal to the preset distance, and a Bluetooth communication function of the mobile terminal is enabled, the Bluetooth communication function is invoked to communicate with the mobile terminal, to transmit the device identifier.

The application program invokes the Bluetooth communication function to communicate with the mobile device.

When the operating system type of the mobile terminal is the first type of operating system, the distance between the data device and the mobile terminal is less than or equal to the preset distance, and the Bluetooth communication function of the mobile terminal is disabled, the acoustic wave transmission function is invoked to communicate with the mobile terminal, to transmit the device identifier.

The application program invokes the acoustic wave transmission function to communicate with the mobile device.

When an operating system type of the mobile terminal is a second type of operating system, the distance between the data device and the mobile terminal is less than or equal to the preset distance, and the mobile terminal supports a near field communication function, the near field communication function is invoked to communicate with the mobile terminal, to transmit the device identifier.

The application program invokes the near field communication function to communicate with the mobile device.

When the operating system type of the mobile terminal is the second type of operating system, the distance between the data device and the mobile terminal is less than or equal to the preset distance, the mobile terminal supports no near field communication function, and a Bluetooth communication function of the mobile terminal is enabled, the Bluetooth communication function is invoked to communicate with the mobile terminal, to transmit the device identifier; or when a Bluetooth communication function of the mobile terminal is disabled, the acoustic wave transmission function is invoked to communicate with the mobile terminal, to transmit the device identifier.

By using multiple data transmission manners, different mobile terminals can be adapted to implement data transmission. That is, mobile terminals with different operating systems and different hardware types may scan the same data device without any modification, increasing efficiency of the system.

In an embodiment, the process of invoking the acoustic wave transmission function to communicate with the mobile terminal, to transmit the device identifier includes: invoking the acoustic wave transmission function to communicate with the mobile terminal, to transmit data including the device identifier at each of multiple different frequencies within the preset duration.

In one embodiment, the number of the multiple frequencies is 6. The preset duration is set according to a requirement, for example, may be 5 approximately ms.

Figure 6:
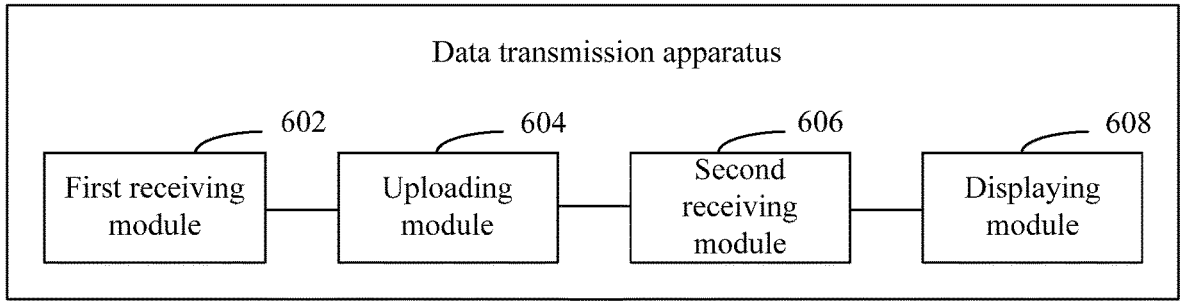
FIG. 6 is a structural block diagram of a data transmission apparatus according to an embodiment of the present disclosure.

FIG. 6 is a structural block diagram of a data transmission apparatus according to an embodiment. As shown in FIG. 6, the data transmission apparatus is located on a mobile terminal, and includes a first receiving module 602, an uploading module 604, a second receiving module 606, and a displaying module 608.

The first receiving module 602 is configured to receive a device identifier broadcasted within a preset distance by a data device according to a trigger instruction when a distance between a mobile terminal and the data device is less than or equal to the preset distance.

The uploading module 604 is configured to upload the device identifier to a server-side corresponding to the application program.

The second receiving module 606 is configured to receive corresponding web page information found by the server-side according to the device identifier.

The displaying module 608 is configured to display the web page information on the application program.

In the foregoing data transmission apparatus, the mobile terminal runs an application program. The first receiving module of the mobile terminal receives a device identifier broadcasted by a data device when a distance between the data device and the mobile terminal is less than or equal to a preset distance, and obtains web page information from a server-side corresponding to the application program according to the device identifier. The mobile terminal obtains the device identifier, and obtains web page data according to the device identifier, and the amount of the obtained data information is large. The mobile terminal scans the data device by using the application program, so that no special read device needs to be used, and the costs are reduced. The data device broadcasts the device identifier, so that the data transmission scope of the data device can be expanded.

In an embodiment, the first receive module 602 is further configured to: when an operating system type of the mobile terminal is a first type of operating system, and the distance between the mobile terminal and the data device is less than or equal to the preset distance, detect whether a Bluetooth communication function is enabled; and if the Bluetooth communication function is enabled, invoke the Bluetooth communication function to communicate with the data device, to obtain the device identifier; or if the Bluetooth communication function is disabled, invoke an acoustic wave transmission function to communicate with the data device, to obtain the device identifier.

The first receive module 602 is further configured to: when an operating system type of the mobile terminal is a second type of operating system, and the distance between the mobile terminal and the data device is less than or equal to the preset distance, invoke the application program to detect whether the mobile terminal supports a near field communication function; and if the near field communication function is supported, invoke the near field communication function to communicate with the data device, to obtain the device identifier; or if the near field communication function is not supported, invoke the application program to detect whether a Bluetooth communication function is enabled; and if the Bluetooth communication function is enabled, invoke the Bluetooth communication function to communicate with the data device, to obtain the device identifier; or if the Bluetooth communication function is disabled, invoke an acoustic wave transmission function to communicate with the data device, to obtain the device identifier.

In an embodiment, the first receiving module 602 invokes an acoustic wave transmission function to communicate with the data device, obtains data sent by the data device at each of multiple different frequencies within preset duration, and parses the data to obtain the device identifier.

In one embodiment, the number of the multiple frequencies is 6. The preset duration is set according to an actual requirement, for example, may be approximately 5 ms.

Figure 7:
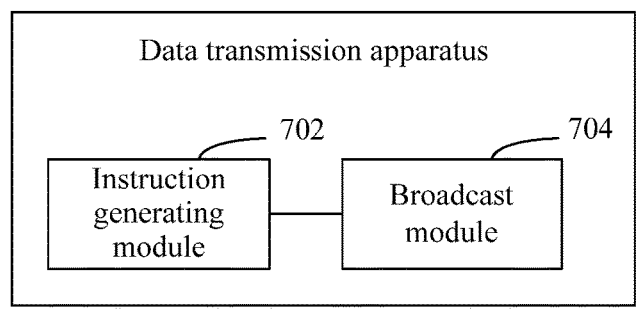
FIG. 7 is a structural block diagram of a data transmission apparatus according to another embodiment of the present disclosure.

FIG. 7 is a structural block diagram of a data transmission apparatus according to another embodiment. As shown in FIG. 7, the data transmission apparatus includes an instruction generating module 702 and a broadcast module 704, located on a data device.

The instruction generating module 702 is configured to generate a broadcast instruction according to a trigger operation.

The broadcast module 704 is configured to broadcast within a preset distance a device identifier of the data device according to the broadcast instruction, so that a mobile terminal enters an application program when a distance between the mobile terminal and the data device is less than or equal to the preset distance. The application program of the mobile terminal receives the device identifier broadcasted by the data device, uploads the device identifier to a server-side corresponding to the application program, receives web page information that is corresponding to the device identifier and found by the server-side according to the device identifier, and displays the web page information on the application program of the mobile terminal.

In the foregoing data transmission apparatus, the data device broadcasts a device identifier according to a trigger instruction. An application program of the mobile terminal receives the device identifier broadcasted by the data device when a distance between the data device and the mobile terminal is less than or equal to a preset distance, and obtains web page information from a server-side corresponding to the application program according to the device identifier. The mobile terminal obtains the device identifier by scanning the data device, and obtains web page data according to the device identifier, and the amount of the obtained data information is large. The mobile terminal scans the data device by using the application program, so that no special read device needs to be used, and the costs are reduced. The data device broadcasts the device identifier, so that the data transmission scope of the data device can be expanded.

In an embodiment, the data transmission apparatus is located on the data device, and not only includes the instruction generating module 702 and the broadcast module 704, but also includes a timing module and a broadcast stopping module.

The timing module is configured to start counting time when the device identifier of the data device starts to be broadcast.

The broadcast stopping module is configured to stop broadcasting the device identifier of the data device when the time count reaches a specified duration.

By setting the broadcast duration and the timing manner, duration in which the data device broadcasts data can be effectively controlled, and broadcast can be stopped after a broadcast time period, to avoid nonstop broadcasting, and reduce energy consumption.

In an embodiment, the data device supports a near field communication function, a Bluetooth communication function, and an acoustic wave transmission function.

When an operating system type of the mobile terminal is a first type of operating system, the distance between the data device and the mobile terminal is less than or equal to the preset distance, and a Bluetooth communication function of the mobile terminal is enabled, the Bluetooth communication function is invoked to communicate with the mobile terminal, to transmit the device identifier.

When the operating system type of the mobile terminal is the first type of operating system, the distance between the data device and the mobile terminal is less than or equal to the preset distance, and the Bluetooth communication function of the mobile terminal is disabled, the acoustic wave transmission function is invoked to communicate with the mobile terminal, to transmit the device identifier.

When an operating system type of the mobile terminal is a second type of operating system, the distance between the data device and the mobile terminal is less than or equal to the preset distance, and the mobile terminal supports a near field communication function, the near field communication function is invoked to communicate with the mobile terminal, to transmit the device identifier.

When the operating system type of the mobile terminal is the second type of operating system, the distance between the data device and the mobile terminal is less than or equal to the preset distance, the mobile terminal supports no near field communication function, and a Bluetooth communication function of the mobile terminal is enabled, the Bluetooth communication function is invoked to communicate with the mobile terminal, to transmit the device identifier; or when a Bluetooth communication function of the mobile terminal is disabled, the acoustic wave transmission function is invoked to communicate with the mobile terminal, to transmit the device identifier.

In an embodiment, the broadcast module 704 invokes the acoustic wave transmission function to communicate with the mobile terminal, to transmit data including the device identifier at each of multiple different frequencies within the preset duration.

A person of ordinary skill in the art may understand that all or some of the processes of the methods in the foregoing embodiments may be implemented by a computer program instructing relevant hardware. The program may be stored in a non-volatile computer-readable storage medium. When the program runs, the processes of the foregoing methods in the embodiments are performed. The storage medium may be a magnetic disc, an optical disc, a read-only memory (ROM), or the like.

The foregoing embodiments only show several implementations of the present disclosure and are described in detail, but they should not be construed as a limit to the patent scope of the present disclosure. It should be noted that, a person of ordinary skill in the art may make various changes and improvements without departing from the ideas of the present disclosure, which shall fall within the protection scope of the present disclosure. Therefore, the protection scope of the patent of the present disclosure shall be subject to the claims.

What is claimed is:

1. A data transmission system, comprising:
a data device having a device identifier and supporting a plurality of communication functions including: Bluetooth communication, Near Field Communication (NFC), and acoustic wave transmission;
a server having a server-side of an application program; and
a mobile terminal having a client-side of the application program, wherein:
the data device is configured to perform: receiving a trigger instruction, and broadcasting within a preset distance, using at least one of the communication functions, the device identifier of the data device according to the trigger instruction; and
the mobile terminal is configured to perform:
executing the client side of the application program and receiving the device identifier broadcasted by the data device when a distance between the mobile terminal and the data device is less than or equal to the preset distance, including:

determining an operating system type of the mobile terminal, the operating system type being either a first type or a second type;
detecting whether a first communication function of the mobile terminal is enabled, the first communication function being NFC function in response to the operating system type being the second type and Bluetooth communication function in response to the operating system type being the first type;
when the first communication function is enabled, obtaining the device identifier broadcasted by the data device through the first communication function; and
when the first communication function is disabled, obtaining the device identifier broadcasted by the data device through a second communication function different from the first communication function, the second communication function being acoustic wave transmission function in response to the operating system type being the first type, and one of Bluetooth communication function and acoustic wave transmission function in response to the operating system type being the second type;
uploading the device identifier to the server-side of the application program, receiving web page information that is corresponding to the device identifier and obtained by the server-side according to the device identifier, and
displaying the web page information on the application program of the mobile terminal.

2. The system according to claim 1, wherein:
when the operating system type of the mobile terminal is the second type of operating system, and the distance between the mobile terminal and the data device is less than or equal to the preset distance, the mobile terminal is configured to:
detect whether the mobile terminal supports a near field communication function;
when the near field communication function is supported, communicate with the data device using the near field communication function to obtain the device identifier; and
when the near field communication function is not supported, detect whether the Bluetooth communication function is enabled; when the Bluetooth communication function is enabled, communicate with the data device using the Bluetooth communication function to obtain the device identifier; and when the Bluetooth communication function is disabled, communicate with the data device using the acoustic wave transmission function to obtain the device identifier.

3. The system according to claim 1, wherein the mobile terminal is further configured to perform:
receiving data containing the device identifier and a current check code and broadcasted by the data device;
parsing the data to obtain the device identifier, generating a new check code according to the device identifier, and comparing whether the new check code is same as the current check code in the received data;
when the new check code and the current check code are the same, determining that the data received is usable and, when the new check code and the current check code are not the same, determining that the data received is not usable.

4. The system according to claim 1, wherein the mobile terminal is further configured to perform:
invoking the acoustic wave transmission function to communicate with the data device;
obtaining data sent by the data device at each of multiple different frequencies within a preset duration; and
parsing the data to obtain the device identifier.

5. The system according to claim 4, wherein:
a data packet of the data sent by the data device through the acoustic wave transmission function includes a packet identifier, data content, and a check bit.

6. The system according to claim 4, wherein:
the multiple different frequencies include a frequency corresponding to beginning of data packet transmission, four frequencies each corresponding to a two-bit binary data, and a frequency corresponding to ending of the data packet transmission.

7. The system according to claim 1, wherein the server is configured to perform:
recording a correspondence between the device identifier and the web page information in advance when the data device registers with the server;
receiving the device identifier uploaded by the mobile terminal;
finding the web page information based on the correspondence and the device identifier; and
sending the web page information to the mobile terminal.

8. The system according to claim 1, wherein:
the data device includes an input device, the input device including a key pad or a touch screen; and
the trigger instruction is received when the input device detects a trigger operation on the key pad or the touch screen.

9. The system according to claim 1, wherein: the preset distance is equal to or less than 10 centimeters.

10. The system according to claim 1, wherein: the preset distance is equal to or less than 1 meter.

11. A data transmission method for a mobile terminal having a client-side of an application program, comprising:
receiving a device identifier of a data device, wherein the data device supports a plurality of communication functions including: Bluetooth communication, Near Field Communication (NFC), and acoustic wave transmission, and the device identifier is broadcasted within a preset distance by the data device using at least one of the communication functions according to a trigger instruction when a distance between the mobile terminal and the data device is less than or equal to the preset distance;
uploading the device identifier to a server-side corresponding to the application program;
receiving corresponding web page information found by the server-side according to the device identifier; and
displaying the web page information on the application program,
wherein receiving the device identifier comprises:
determining an operating system type of the mobile terminal, the operating system type being either a first type or a second type;
detecting whether a first communication function of the mobile terminal is enabled, the first communication function being NFC function in response to the operating system type being the second type and Bluetooth communication function in response to the operating system type being the first type;

when the first communication function is enabled, obtaining the device identifier broadcasted by the data device through the first communication function; and when the first communication function is disabled, obtaining the device identifier broadcasted by the data device through a second communication function different from the first communication function, the second communication function being acoustic wave transmission function in response to the operating system type being the first type, and one of Bluetooth communication function and acoustic wave transmission function in response to the operating system type being the second type.

12. The method according to claim 11, wherein the receiving a device identifier of a data device comprises:
when the operating system type of the mobile terminal is the second type of operating system, and the distance between the mobile terminal and the data device is less than or equal to the preset distance, detecting whether the mobile terminal supports a near field communication function;

when the near field communication function is supported, invoking the near field communication function to communicate with the data device to obtain the device identifier; and when the near field communication function is not supported, detecting whether a Bluetooth communication function is enabled; when the Bluetooth communication function is enabled, invoking the Bluetooth communication function to communicate with the data device to obtain the device identifier; and when the Bluetooth communication function is disabled, invoking an acoustic wave transmission function to communicate with the data device to obtain the device identifier.

13. The method according to claim 11, Futher comprising:
invoking the acoustic wave transmission function to communicate with the data device;
obtaining data sent by the data device at each of multiple different frequencies within a preset duration, and
parsing the data to obtain the device identifier.

14. A data transmission method for a data device, comprising:
generating a broadcast instruction according to a trigger operation, wherein the data device supports a plurality of communication functions including: Bluetooth communication, Near Field Communication (NFC), and acoustic wave transmission; and broadcasting, using at least one of the communication functions, within a preset distance a device identifier of the data device according to the broadcast instruction, such that, when a distance between a mobile terminal and the data device is less than or equal to the preset distance, the device identifier broadcasted by the data device is received by the mobile terminal and configured to locate corresponding web page information at a server when the mobile terminal uploads the device identifier to a server-side of the application program, wherein an operating system type of the mobile terminal is either a first type or a second type, and broadcasting the device identifier comprises:
when a first communication function of the mobile terminal is enabled, broadcasting the device identifier through the first communication function, the first communication function being NFC function in response to the operating system type being the second type and Bluetooth communication function in response to the operating system type being the first type; and when the first communication function of the mobile terminal is disabled, broadcasting the device identifier through a second communication function different from the first communication function, the second communication function being acoustic wave transmission function in response to the operating system type being the first type, and one of Bluetooth communication function and acoustic wave transmission function in response to the operating system type being the second type.

15. The method according to claim 14, wherein after broadcasting within a preset distance a device identifier of a data device according to the broadcast instruction, the method comprises:
starting counting time when the device identifier of the data device starts to be broadcasted; and
stopping broadcasting the device identifier of the data device when a time count reaches for a specified duration.

16. The method according to claim 14, wherein:
when the operating system type of the mobile terminal is the second type of operating system, the distance between the data device and the mobile terminal is less than or equal to the preset distance, and the mobile terminal supports a near field communication function, the near field communication function is invoked to communicate with the mobile terminal, to transmit the device identifier; and when the operating system type of the mobile terminal is the second type of operating system, the distance between the data device and the mobile terminal is less than or equal to the preset distance, the mobile terminal supports no near field communication function, and a Bluetooth communication function of the mobile terminal is enabled, the Bluetooth communication function is invoked to communicate with the mobile terminal, to transmit the device identifier; or when a Bluetooth communication function of the mobile terminal is disabled, the acoustic wave transmission function is invoked to communicate with the mobile terminal, to transmit the device identifier.

17. The method according to claim 14, further comprising:
invoking the acoustic wave transmission function to communicate with the mobile terminal, to transmit data comprising the device identifier at each of multiple different frequencies within a preset duration.

* * * * *